(12) United States Patent
Horikoshi et al.

(10) Patent No.: US 8,058,334 B2
(45) Date of Patent: *Nov. 15, 2011

(54) POLYESTER RESIN COMPOSITION

(75) Inventors: Takahiro Horikoshi, Saitama (JP);
Naoshi Kawamoto, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/442,767

(22) PCT Filed: Aug. 9, 2007

(86) PCT No.: PCT/JP2007/065629
§ 371 (c)(1),
(2), (4) Date: Mar. 25, 2009

(87) PCT Pub. No.: WO2008/038465
PCT Pub. Date: Apr. 3, 2008

(65) Prior Publication Data
US 2010/0113710 A1    May 6, 2010

(30) Foreign Application Priority Data

Sep. 28, 2006   (JP) ................ 2006-265724

(51) Int. Cl.
*C08J 7/04*    (2006.01)
(52) U.S. Cl. ........ 524/168; 524/169; 524/317; 524/378; 524/394; 524/601; 525/437; 525/449
(58) Field of Classification Search .......... 525/437, 525/449; 524/601, 168, 169, 394, 378, 317
See application file for complete search history.

(56) References Cited

U.S. PATENT DOCUMENTS

| | | | |
|---|---|---|---|
| 3,756,997 A | 9/1973 | Eichers et al. | |
| 4,254,015 A * | 3/1981 | Thomas et al. | 524/168 |
| 4,438,233 A * | 3/1984 | Lee | 524/299 |
| 4,486,560 A * | 12/1984 | Thomas | 524/100 |
| 4,558,081 A * | 12/1985 | Thomas | 524/100 |
| 5,276,077 A * | 1/1994 | Schwane et al. | 524/133 |
| 5,663,280 A * | 9/1997 | Ogoe et al. | 528/196 |
| 5,700,857 A * | 12/1997 | Mukohyama | 524/290 |
| 6,433,050 B1 * | 8/2002 | Shinomiya et al. | 524/265 |
| 6,740,697 B1 * | 5/2004 | Brenner et al. | 524/166 |
| 7,375,167 B2 * | 5/2008 | Natarajan et al. | 525/438 |

FOREIGN PATENT DOCUMENTS

| | | |
|---|---|---|
| JP | 60-210636 A | 10/1985 |
| JP | 02-248460 A | 10/1990 |
| JP | 02-187451 A | 7/1991 |
| JP | 03-273050 A | 12/1991 |
| JP | 08-059968 A | 3/1996 |
| JP | 2002-507955 A | 3/2002 |
| JP | 2005-162867 A | 6/2005 |
| JP | 2006-113473 A | 4/2006 |
| WO | 99/02424 | 1/1999 |

OTHER PUBLICATIONS

Wypych, G.; Handbook of Plasticizers, Wm. Andrew Publishing, 2004, p. 303-305.*
Wypych, G.; Handbook of Plasticizers, 2003, p. 313-315.*

* cited by examiner

*Primary Examiner* — David W Wu
*Assistant Examiner* — Robert Jones, Jr.
(74) *Attorney, Agent, or Firm* — Sughrue Mion, PLLC

(57) ABSTRACT

To provide a polyester resin composition having a high crystallization rate and excellent moldability.

A polyester resin composition comprising (a) a polyester resin, (b) one or more sulfonamide compound metal salt having a structure represented by a general formula selected from the group consisting of the following general formula (1):

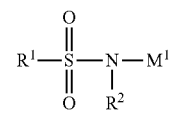

(1)

the following general formula (2):

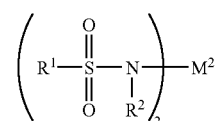

(2)

and the following general formula (3):

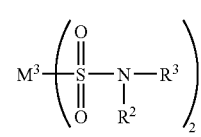

(3)

and (c) an aliphatic carboxylic acid diester compound of polyalkylene glycol represented by the following general formula (4):

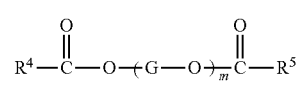

(4)

(in the formula (4), G represents an alkylene group having 2 to 4 carbon atoms; $R^4$ and $R^5$ each independently represent an alkyl or alkenyl group having 1 to 14 carbon atoms; and m represents a integral number of 2 to 30).

9 Claims, No Drawings

POLYESTER RESIN COMPOSITION

TECHNICAL FIELD

The present invention relates to a polyester resin composition, in particular, relates to a polyester resin composition having a high crystallization rate and excellent moldability.

BACKGROUND ART

Polyester resins such as polyethylene terephthalate, polymethylene terephthalate, polyethylene naphthalate, polylactic acid, and the like are excellent in heat resistance, chemical resistance, dynamic characteristics, electric characteristics, and the like and also excellent in cost and performance, and are thus widely used as fibers and films in the industrial field. Further, the polyester resins are excellent in gas barrier property, sanitary property, and transparency and are thus widely used for beverage bottles, cosmetic and pharmaceutical containers, detergent and shampoo containers, and the like.

However, polyester resins generally have extremely low crystallization rates in spite of being crystalline resins, and thus have a very narrow range of molding conditions and difficulty in improving a processing cycle. Therefore, use as molding materials is still restricted. Further, molded products prepared by molding polyester resins have low heat distortion temperatures, and thus there is the problem of limiting operating temperatures.

A generally known method for improving the crystallization rates of polyester resins includes adding a nucleator. Such nucleators include a mineral, an organic acid metal salt, an inorganic salt, a metal oxide, or the like. General-purpose compounds used as the nucleator include metal salts, such as sodium benzoate, aluminum p-tert-butylbenzoate, aromatic phosphate metal salts, and the like; and compounds such as dibenzylidene sorbitol and the like.

Further, there is known a method of adding a resin oligomer for improving mobility at a resin processing temperature. For example, Patent Document 1 proposes a method of adding a metal salt of an abietic acid compound in order to promote the crystallization rate of a polyester resin. Patent Document 2 discloses a method of adding 4-aminobenzenesulfonamide to an olefin resin. Patent Document 3 proposes a method of adding a phosphate metal salt and an aliphatic carboxylic acid metal salt to a crystalline polymer.

Patent Document 4 proposes a method using a transition metal salt of a carboxylic acid as a nucleator for a composition containing polyethylene terephthalate and polyethylene naphthalate. Patent Document 5 proposes a method of obtaining a polyester resin composition by using an alkylene bis fatty acid amide and a quinacridone as a nucleator.

Patent Document 1: Japanese Unexamined Patent Application Publication No. 08-059968
Patent Document 2: U.S. Pat. No. 3,756,997
Patent Document 3: Japanese Unexamined Patent Application Publication No. 2005-162867
Patent Document 4: Japanese Unexamined Patent Application Publication (translation of PCT Application) No. 2002-507955
Patent Document 5: Japanese Unexamined Patent Application Publication No. 2006-113473

DISCLOSURE OF INVENTION

Problems to be Solved by the Invention

However, the effect of improving the crystallization rate of a polyester resin by adding a generally known additive has not yet been satisfactory. The method of adding a resin oligomer such as ethylene glycol or the like contributes to the crystallization rate of a resin to some extent, but there has been a problem that the dynamic strength of the resulting molded product may be decreased.

Since an improvement in a molding cycle due to an improvement in a crystallization rate can increase the amount of molded products which can be produced by an existing equipment, the development of a higher-performance nucleator is demanded.

Accordingly, an object of the present invention is to resolve the problem of prior art and provide a polyester resin composition having a high crystallization rate and an excellent moldability.

Means for Solving the Problems

As a result of intensive research to resolve the above-described problem, the inventors of the present invention have found that the object can be achieved by adding a metal salt of predetermined sulfonamide compound and aliphatic carboxylic acid diester compound of polyalkylene glycol to a polyester resin, leading to the completion of the present invention.

That is, a polyester resin composition of the present invention comprises (a) a polyester resin,
(b) one or more sulfonamide compound metal salt having a structure represented by a general formula selected from the group consisting of the following general formula (1):

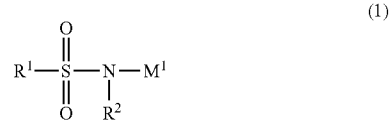

(in the formula (1), $R^1$ and $R^2$ each independently represent a hydrogen atom, a halogen atom, an alkali metal atom, an amino group, a branched or linear alkyl group which may have substituents and has 1 to 10 carbon atoms, a branched or linear alkoxy group which may have substituents and has 1 to 10 carbon atoms, or a cyclic group which may have substituents and has 3 to 30 carbon atoms; $R^1$ and $R^2$ may be bonded together to form a cyclic group; $M^1$ represents a halogen atom, an alkali metal atom or $Al(OH_2)_2$), the following general formula (2):

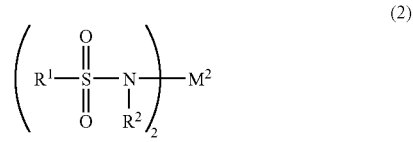

(in the formula (2), $R^1$ and $R^2$ represent the same meanings as in the formula (1); $M^2$ represents magnesium, calcium, strontium, barium, titanium, manganese, iron, zinc, silicon, zirconium, yttrium, barium, Al(OH), a branched or linear alkylene group which may have substituents and has 1 to 12 carbon atoms, a branched or linear alkenylene group which may have substituents and has 2 to 12 carbon atoms, a cycloalkylene group which may have substituents and has 3 to 8 carbon atoms, a branched or linear alkylene group which may have substituents and has ether bonds and 4 to 20 carbon atoms, a branched or linear alkylene group which may have substituents and is interrupted by a cycloalkylene group and 5 to 20 carbon atoms, an arylene group which may have substituents and has 6 to 12 carbon atoms, or a combination thereof), and the following general formula (3):

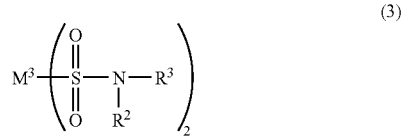

(in the formula (3), $R^2$ and $R^3$ each independently represent a hydrogen atom, a halogen atom, an alkali metal atom, an amino group, a branched or linear alkyl group which may have substituents and has 1 to 10 carbon atoms, a branched or linear alkoxy group which may have substituents and has 1 to 10 carbon atoms, or a cyclic group which may have substituents and has 3 to 30 carbon atoms; $R^2$ and $R^3$ may be bonded together to form a cyclic group; $M^3$ represents the same meanings as $M^2$ in the above general formula (2)), and (c) an aliphatic carboxylic acid diester compound of polyalkylene glycol represented by the following general formula (4):

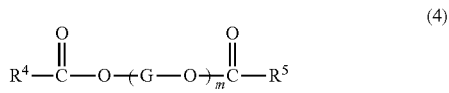

(in the formula (4), G represents an alkylene group having 2 to 4 carbon atoms; $R^4$ and $R^5$ each independently represent an alkyl or alkenyl group having 1 to 14 carbon atoms; m represents a integral number of 2 to 30).

Advantages

By adding the (b) sulfonamide compound metal salt and the (c) aliphatic carboxylic acid diester compound of polyalkylene glycol as nucleators, according to the present invention, into the (a) polyester resin, a polyester resin composition having a high crystallization rate and excellent moldability can be provided.

BEST MODE FOR CARRYING OUT THE INVENTION

A polyester resin composition of the present invention will be described in detail below.

The (a) polyester resin used in the polyester resin composition of the present invention is a usual thermoplastic polyester resin and is not particularly limited. Examples of the polyester resin include aromatic polyester such as polyalkylene terephthalate such as polyethylene terephthalate, polybutylene terephthalate, polycyclohexanedimethylene terephthalate and the like, polyalkylene naphthalate such as polyethylene naphthalate, polybutylene naphthalate and the like; polyether-ester resins prepared by copolymerizing a polyester constituent and another acid component and/or a glycol component (e.g., an acid component such as isophthalic acid, adipic acid, sebacic acid, glutaric acid, diphenylmethane dicarboxylic acid, dimer acid, or the like and a glycol component such as hexamethylene glycol, bisphenol A, neopentyl glycol alkylene oxide adduct, or the like); degradable aliphatic polyesters, such as polyhydroxybutylate, polycaprolactone, polybutylene succinate, polyethylene succinate, polylactic acid resins, polymalic acid, polyglycolic acid, polydioxanone, poly(2-oxetanone), and the like; and broad polyester resins, such as aromatic polyester/polyether block copolymers, aromatic polyester/polylactone block copolymers, polyarylate, and the like. Among these resins, polyethylene terephthalate and polybutylene terephthalate, are preferably used.

The thermoplastic polyester resin may be a single resin, a blend of a plurality of resins (e.g., a blend of polyethylene terephthalate and polybutylene terephthalate), or a copolymer thereof (e.g., a copolymer of polybutylene terephthalate and polytetramethylene glycol). In particular, a thermoplastic polyester resin having a melting point of 200° C. to 300° C. is preferably used because it exhibits an excellent heat resistance.

$M^1$ in the above formula (1) represents a halogen atom, an alkali metal atom or Al $(OH_2)_2$. Among these, an alkali metal atom is particularly preferred. Examples of alkali metal atom include lithium, sodium and potassium. Sodium atom is particularly preferably used because the effect of the present invention is remarkable.

$M^2$ in the above formula (2) and $M^3$ in the above formula (3) represent magnesium, calcium, strontium, barium, titanium, manganese, iron, zinc, silicon, zirconium, yttrium, barium, Al(OH), a branched or linear alkylene group which may have substituents and has 1 to 12 carbon atoms, a branched or linear alkenylene group which may have substituents and has 2 to 12 carbon atoms, a cycloalkylene group which may have substituents and has 3 to 8 carbon atoms, a branched or linear alkylene group which may have substituents and has ether bonds and 4 to 20 carbon atoms, a branched or linear alkylene group which may have substituents and is interrupted by a cycloalkylene group and 5 to 20 carbon atoms, an arylene group which may have substituents and has 6 to 12 carbon atoms, or a combination thereof. Examples of a branched or linear alkylene group which may have substituents and has 1 to 12 carbon atoms include ethylene, 1,2-propylene, 1,3-propylene, 1,3-butylene, 1,4-butylene, or the like. Examples of a branched or linear alkenylene group which may have substituents and has 2 to 12 carbon atoms include vinylene, propenylene, or the like. Examples of a cycloalkylene group which may have substituents and has 3 to 8 carbon atoms include cyclopropene, cyclohexene, or the like. Examples of an arylene group which may have substituents and has 6 to 12 carbon atoms include phenylene, naphthylene, or the like.

Examples of a branched or linear alkyl group which may have substituents and has 1 to 10 carbon atoms, represented by $R^1$ or $R^2$ in the above-described general formula (1) and (2) and by $R^2$ or $R^3$ in the above-described general formula (3), include methyl, ethyl, propyl, isopropyl, butyl, isobutyl, sec-butyl, tert-butyl, amyl, isoamyl, tert-amyl, hexyl, heptyl, octyl, isooctyl, 2-ethylhexyl, tert-octyl, nonyl, decyl, and the like. In these alkyl groups, a given —$CH_2$— may be substituted by —O—, —CO—, —COO—, or —$SiH_2$— and hydrogen atoms may be partially or entirely substituted by a halogen atom such as fluorine, chlorine, bromine, iodine, or the like, a cyano group, —$SO_2$—$NR^2$-$M^1$, —$NM^1$-$SO_2$—$R^1$, or the like ($R^1$, $R^2$ and $M^1$ represent the same meanings as in the above-described formula (1)).

Examples of a branched or linear alkoxy group which may have substituents and has 1 to 10 carbon atoms, represented by $R^1$ or $R^2$ in the above-described general formula (1) and (2) and by $R^2$ or $R^3$ in the above-described general formula (3), include methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy, decyloxy, and the like. In these alkoxy groups, a given —CH$_2$— may be substituted by —O—, —CO—, —COO—, or —SiH$_2$— and hydrogen atoms may be partially or entirely substituted by a halogen atom such as fluorine, chlorine, bromine, iodine, or the like, a cyano group, —SO$_2$—NR$^2$-M$^1$, —NM$^1$-SO$_2$—R$^1$, or the like (R$^1$, R$^2$ and M$^1$ represent the same meanings as in the above-described formula (1)).

A cyclic group having 3 to 30 carbon atoms, represented by R$^1$ or R$^2$ in the above-described general formula (1) and (2) and by R$^2$ or R$^3$ in the above-described general formula (3), may be monocyclic, polycyclic, a condensed ring, or a ring of sets and may be either an aromatic cyclic group or a saturated aliphatic cyclic group. A carbon atom in a ring may be substituted by an oxygen atom, a nitrogen atom, a sulfur atom, or the like, and hydrogen atoms of a ring may be partially or entirely substituted by an alkyl group having 1 to 5 carbon atoms, an alkoxy group having 1 to 5 carbon atoms, amino group, halogen atom, —SO$_2$—NR$^2$-M$^1$, —NM$^1$-SO$_2$—R$^1$, or the like (R$^1$, R$^2$ and M$^1$ represent the same meanings as in the above-described formula (1)). Examples of such a cyclic group having 3 to 30 carbon atoms include pyrrole, furan, thiophene, imidazole, pyrazole, oxazole, isoxazole, thiazole, isothiazole, pyridine, pyridazine, pyrimidine, pyrazine, piperidine, piperazine, morpholine, phenyl, naphthyl, anthracene, biphenyl, triphenyl, 2-methylphenyl(o-tolyl, cresyl), 3-methylphenyl(m-tolyl), 4-methylphenyl(p-tolyl), 4-chlorophenyl, 4-hydroxyphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl(xylyl), 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, cyclohexylphenyl, biphenyl, 2,4,5-trimethylphenyl(mesityl), 4-aminophenyl, 5-dimethylaminonaphthyl, 6-ethoxy-benzothiazolyl, 2,6-dimethoxy-4-pyrimidyl, 5-methyl-1,3,4-thiadiazol-2-yl, 5-methyl-3-isoxazolyl, and the like. Among these, phenyl is particularly preferred.

Preferred examples of the (b) sulfonamide compounds represented by the general formulae (1), (2) and (3) include the following compound Nos. 1 to 20.

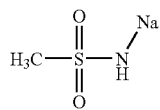

Compound No. 1

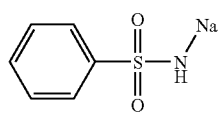

Compound No. 2

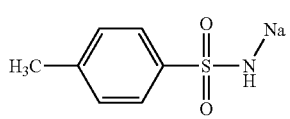

Compound No. 3

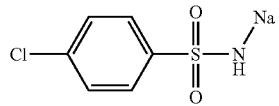

Compound No. 4

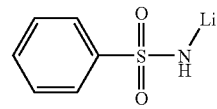

Compound No. 5

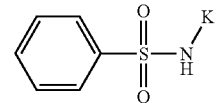

Compound No. 6

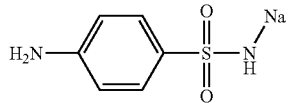

Compound No. 7

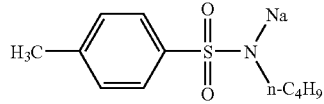

Compound No. 8

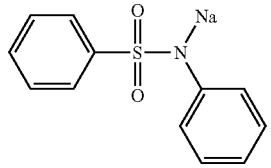

Compound No. 9

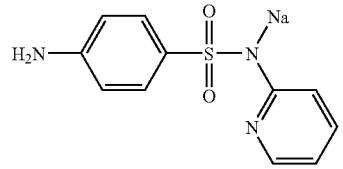

Compound No. 10

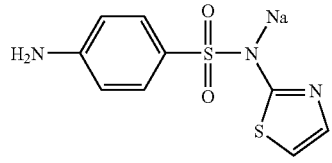

Compound No. 11

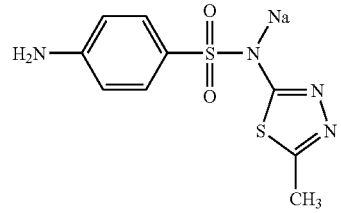

Compound No. 12

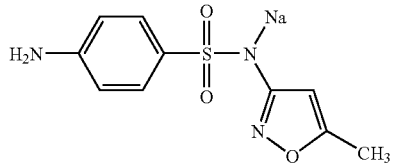

Compound No. 13

-continued

Compound No. 14
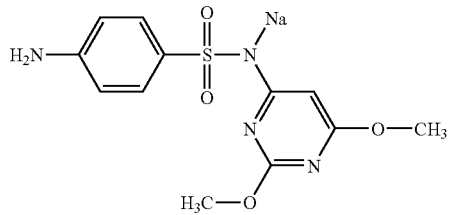

Compound No. 15
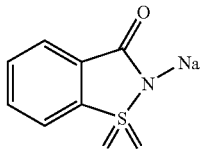

Compound No. 16
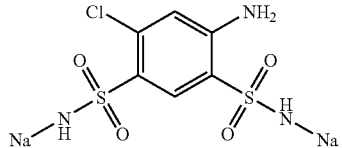

Compound No. 17
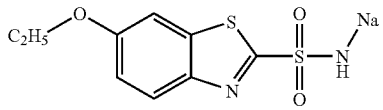

Compound No. 18
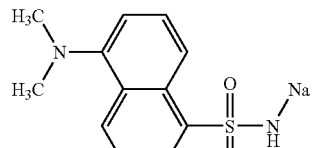

Compound No. 19
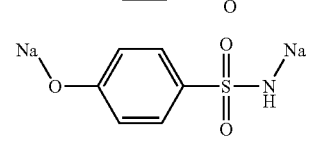

Compound No. 20
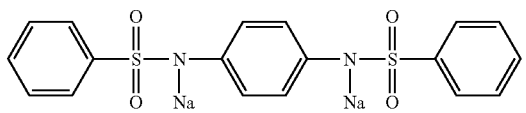

The (b) sulfonamide compound metal salt of the present invention is preferably added in an amount of 0.01 to 10 parts by mass, more preferably 0.05 to 5 parts by mass, and most preferably 0.1 to 3 parts by mass relative to 100 parts by mass of the (a) polyester resin. When the amount is less than 0.01 parts by mass, the effect of addition is insufficient, while when the amount exceeds 10 parts by mass, there occurs the phenomenon that the (b) sulfonamide compound metal salt appears on surface of the polyester resin composition.

Examples of aliphatic carboxylic acid which constitutes alkyl or alkenyl group having 1 to 14 carbon atoms, represented by $R^4$ or $R^5$ in the above-described formula (4) of the (c) aliphatic carboxylic acid diester compound of polyalkylene glycol used in the present invention, include saturated aliphatic carboxylic acid such as acetic acid, propionic acid, butanoic acid, pentanoic acid, hexanoic acid, heptanoic acid, octanoic acid, 2-ethylhexanoic acid, nonanoic acid, decanoic acid, undecanoic acid, dodecanoic acid, tetradecanoic acid; and unsaturated aliphatic carboxylic acid such as acrylic acid, methacrylic acid, crotonic acid, vinylacetic acid, pentenoic acid, hexenoic acid, octenoic acid, decenoic acid, dodecenoic acid.

Examples of alkylene group having 2 to 4 carbon atoms, represented by G in the above-described formula (4), include ethylene, 1,2-propylene, 1,3-propylene 1,3-butylene, 1,4-butylene.

The (c) an aliphatic carboxylic acid diester compound of polyalkylene glycol represented by the above-described formula (4) can be synthesized by a generally known method, for example, by dehydration condensation reaction between hydroxyl compound and aliphatic carboxylic acid, ester exchange reaction between hydroxyl compound and aliphatic carboxylic acid or by a method in which hydroxyl compound and aliphatic carboxylic acid halogen compound react using dehalogenation hydrogen scavenger.

Therefore, preferred examples of the (c) aliphatic carboxylic acid diester compound of polyalkylene glycol represented by the above-described formula (4) include Compound No. 21 to No. 29 having an average molecular weight (MW) of 100 to 1000 described in the following Table 1, but the present invention is not limited into these compounds.

TABLE 1

| Compound No. | Compound Name |
|---|---|
| Compound No. 21 | Polyethylene glycol(MW200) diheptanoate |
| Compound No. 22 | Polyethylene glycol(MW300) di-2-ethylhexanoate |
| Compound No. 23 | Polyethylene glycol(MW600) di-2-ethylhexanoate |
| Compound No. 24 | Polyethylene glycol(MW1000) didecanoate |
| Compound No. 25 | Polyethylene glycol(MW300) didodecanoate |
| Compound No. 26 | Polyethylene glycol(MW600) heptanoate/dodecanoate(1/1 mix) |
| Compound No. 27 | Polypropylene glycol(MW400) diheptanoate |
| Compound No. 28 | Polytetramethylene glycol(MW600) di-2-ethylhexanoate |
| Compound No. 29 | Polyethylene glycol/Polypropylene glycol(1/1 mix) (MW600) diheptanoate |

Among the (c) aliphatic carboxylic acid diester compounds of polyalkylene glycol in the above-described Table 1, Compound No. 22 and No. 23 are used more preferably because effects of the present invention are remarkable. In the Table 1, commercial products of Compound No. 22 include ADK CIZER RS-700 (ADEKA CORPORATION), and commercial products of Compound No. 23 include ADK CIZER-RS-735.

The (c) aliphatic carboxylic acid diester compounds of polyalkylene glycol represented by the formula (4) according to the present invention is preferably added in an amount of 0.5 to 30 parts by mass, and more preferably 1 to 10 parts by mass relative to 100 parts by mass of the (a) polyester resin. When the amount is less than 0.5 parts by mass, the effect of addition is insufficient, while when the amount exceeds 30 parts by mass, there occurs the phenomenon that the (c) aliphatic carboxylic acid diester compounds of polyalkylene glycol appears on surface of the polyester resin composition.

According to demand, generally used other additives may be added to the polyester resin composition within a range in which the advantage of the present invention is not impaired.

Examples of the other additives include phenolic, phosphoric, and sulfuric antioxidants and the like; light stabilizers such as a hindered amine light stabilizer, an ultraviolet absorber, and the like; lubricants such as hydrocarbons, fatty acids, aliphatic alcohols, aliphatic esters, aliphatic amide compounds, aliphatic carboxylic acid metal salts, other metallic soaps, and the like; heavy metal deactivators; anti-fogging agents; antistatic agents such as a cationic surfactant, an anionic surfactant, a nonionic surfactant, an amphoteric surfactant, and the like; halogen compounds; phosphate compounds; phosphoric acid amide compounds; melamine compounds; fluorocarbon resins or metal oxides; flame retardants such as (poly) phosphoric acid melamine, (poly) phosphoric acid piperazine and the like; fillers such as glass fibers, calcium carbonate, and the like; pigments; inorganic silicate additives such as hydrotalcite, fumed silica, fine particle silica, silica rock, diatomites, clay, kaolin, diatomaceous earth, silica gel, calcium silicate, sericite, kaolinite, flint, feldspar powder, vermiculite, attapulgite, talc, mica, minesotite, pyrophyllite, silica, and the like; nucleators such as dibenzylidene sorbitol, bis(p-methylbenzylidene) sorbitol, bis(p-ethylbenzylidene) sorbitol, disodium bicyclo[2.2.1]heptane-2,3-dicarboxylate, and the like. In particular, phenolic and phosphoric antioxidants are preferably used because of the effect of preventing coloring of the polyester resin composition.

Examples of the phenolic antioxidants include 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, tridecyl-3,5-di-tert-butyl-4-hydroxybenzyl thioacetate, thiodiethylene bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycol ester, 4,4'-butylidene bis(2,6-di-tert-butylphenol), 4,4'-butylidene bis(6-tert-butyl-3-methylphenol), 2,2'-ethylidene bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris [(3,5-di-tert-butyl-4-hydroxyphenyl)propionyloxyethyl] isocyanurate, tetrakis[methylene-3-(3',5'-di-tert-butyl-4'-hydroxyphenyl) propionate]methane, 2-tert-butyl-4-methyl-6-(2-acroyloxy-3-tert-butyl-5-methylbenzyl)phenol, 3,9-bis [2-(3-tert-butyl-4-hydroxy-5-methylhydrocinnamoyloxy)-1,1-dimethylethyl]-2,4,8,10-tetraoxaspiro[5.5]undecane, triethylene glycol bis[β-(3-tert-butyl-4-hydroxy-5-methylphenyl)propionate], and the like.

Examples of the phosphoric antioxidants include triphenyl phosphite, tris(2,4-di-tert-butylphenyl)phosphite, tris(2,5-di-tert-butylphenyl)phosphite, tris(nonylphenyl) phosphite, tris (dinonylphenyl)phosphite, tris(mono/di-mixed nonylphenyl) phosphite, diphenyl acid phosphite, 2,2'-methylene bis(4,6-di-tert-butylphenyl)octyl phosphite, diphenyldecyl phosphite, diphenyloctyl phosphite, di(nonylphenyl) pentaerythritol diphosphite, phenyldiisodecyl phosphite, tributyl phosphite, tris(2-ethylhexyl)phosphite, tridecyl phosphite, trilauryl phosphite, dibutylacid phosphite, dilauryl acid phosphite, trilauryl trithiophosphite, bis(neopentyl glycol)-1,4-cyclohexane dimethyl diphosphite, bis(2,4-di-tert-butylphenyl)pentaerythritol diphosphite, bis(2,5-di-tert-butylphenyl) pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra(C12-C15 mixed alkyl)-4,4'-isopropylidenediphenyl phosphite, bis[2,2'-methylenebis (4,6-diamylphenyl)]-isopropylidenediphenyl phosphite, tetramidecyl-4,4'-butylidenebis(2-tert-butyl-5-methylphenol) diphosphite, hexa(tridecyl)-1,1,3-tris(2-methyl-5-tert-butyl-4-hydroxyphenyl)butane triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepin-6-yl) oxy]ethyl)amine, 9,10-dihydro-9-oxa-10-phosphaphenanthrene-10-oxide, 2-butyl-2-ethylpropanediol-2,4,6-tri-tert-butylphenol monophosphite, and the like.

Examples of the sulfuric antioxidants include dialkyl thiodipropionates such as dilauryl, dimyristyl, myristylstearyl, and distearyl esters of thiodipropionic acid, and the like; and polyol β-alkylmercaptopropionates such as pentaerythritol tetra(β-dodecylmercaptopropionate) and the like.

Examples of the hindered amine light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis (1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidyl methacrylate, 2,2,6,6-tetramethyl-piperidyl methacrylate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-bis(tridecyl)-1,2,3,4-butanetetracarboxylate, bis(1,2,2,6,6-pentamethyl-4-piperidyl)-bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 3,9-bis[1,1-dimethyl-2-{tris(2,2,6,6-tetramethyl-4-piperidyl oxycarbonyloxy) butylcarbonyloxy}ethyl]-2,4,8,10-tetraoxaspiro[5.5] undecane, 3,9-bis[1,1-dimethyl-2-{(tris(1,2,2,6,6-pentamethyl-4-piperidyloxycarbonyloxy) butylcarbonyloxy}ethyl]-2,4,8,10-tetraoxaspiro[5.5]undecane, 1,6-bis(2,2,6,6-tetramethyl-4-piperidylamino)hexane/ 2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8, 12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-ylamino]undecane, 1,6,1'-tris [2,4-bis(N-butyl-N-(1,2,2,6,6-pentamethyl-4-piperidyl) amino)-s-triazin-6-ylamino]undecane, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, and the like.

Examples of the ultraviolet absorber include 2-hydroxybenzophenones, such as 2,4-dihydroxybenzophenone, 2-hydroxy-4-methoxybenzophenone, 2-hydroxy-4-octoxybenzophenone, 5,5'-methylene bis(2-hydroxy-4-methoxybenzophenone), and the like; 2-(2-hydroxyphenyl) benzotriazoles, such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene bis(4-tert-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, -[hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2- methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, 2-[2-hydroxy-4-(3-methacryloyloxypropyl) phenyl]benzotriazole, and the like; 2-(2-hydroxyphenyl)-4,6-diaryl-1,3,5-triazines, such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12-C13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine, 2,4,6-tris(2-hydroxy-3-methyl-4-hexyloxyphenyl)-1,3,5-triazine, and the like; benzoates, such as phenyl salicylate, resorcinol monobenzoate, 2,4-di-tert-butylphenyl-3,5-di-tert-butyl-4-hydroxybenzoate, octyl (3,5-di-tert-butyl-4-hydroxy)benzoate, dodecyl (3,5-di-tert-butyl-4-hydroxy)benzoate, tetradecyl (3,5-di-tert-butyl-4-hydroxy)benzoate, hexadecyl (3,5-di-tert-butyl-4-hydroxy)benzoate, octadecyl (3,5-di-tert-butyl-4-hydroxy)benzoate, behenyl (3,5-di-tert-butyl-4-hydroxy)benzoate, and the like; substituted oxanilides, such as 2-ethyl-2'-ethoxyoxanilide, 2-ethoxy-4'-dodecyloxanilide, and the like; cyanoacrylates, such as ethyl α-cyano-β,β-diphenylacrylate, methyl-2-cyano-3-methyl-3-(p-methoxyphenyl)acrylate, and the like; and various metal salts or metal chelates, particularly nickel or chromium salts or chelates.

Examples of aliphatic amide compounds used as the lubricant include mono-fatty acid amides, such as lauric acid amide, stearic acid amide, oleic acid amide, erucic acid amide, ricinoleic acid amide, 12-hydroxystearic acid amide, and the like; N,N'-bis-fatty acid amides, such as N,N'-ethylene-bis-lauric acid amide, N,N'-methylene-bis-stearic acid amide, N,N'-ethylene-bis-stearic acid amide, N,N'-ethylene-bis-oleic acid amide, N,N'-ethylene-bis-behenic acid amide, N,N'-ethylene-bis-12-hydroxystearic acid amide, N,N'-butylene-bis-stearic acid amide, N,N'-hexamethylene-bis-stearic acid amide, N,N'-hexamethylene-bis-oleic acid amide, N,N'-xylylene-bis-stearic acid amide, and the like; alkylol amides, such as stearic acid monomethylol amide, palm oil fatty acid monoethanol amide, stearic acid diethanol amide, and the like; N-substituted fatty acid amides, such as N-oleylstearic acid amide, N-oleyloleic acid amide, N-stearylstearic acid amide, N-stearyloleic acid amide, N-oleylpalmitic acid amide, N-stearylerucic acid amide, and the like; and N,N'-substituted dicarboxylic acid amides, such as N,N'-dioleyladipic acid amide, N,N'-distearyladipic acid amide, N,N'-dioleylsebacic acid amide, N,N'-distearylsebacic acid amide, N,N'-distearylterephthalic acid amide, N,N'-distearylisophthalic acid amide, and the like. These compounds may be used alone or as a mixture of two or more.

Examples of the flame retardants include phosphates, such as triphenyl phosphate, phenol.resorcinol.phosphorus oxychloride condensate, phenol.bisphenol A.phosphorus oxychloride condensate, 2,6-xylenol.resorcinol.phosphorus oxychloride condensate, and the like; phosphoric acid amides, such as aniline.phosphorus oxychloride condensate, phenol.xylylenediamine.phosphorus oxychloride condensate, and the like; phosphazene; halogen flame retardants, such as decabromodiphenyl ether, tetrabromobisphenol A, and the like; phosphates of nitrogen-containing organic compounds such as melamine phosphate, piperazine phosphate, melamine pyrophosphate, piperazine pyrophosphate, melamine polyphosphate, piperazine polyphosphate, and the like; red phosphorus and surface-treated and microencapsulated red phosphorus; flame retardant auxiliaries, such as antimony oxide, zinc borate, and the like; anti-dripping agents, such as polytetrafluoroethylene, silicone resin, and the like. The flame retardants are preferably used in an amount of 1 to 30 parts by mass, more preferably in amount of 5 to 20 parts by mass relative to 100 parts by mass of the polyester.

The method of adding the (b) sulfonamide compound metal salt and the (c) aliphatic carboxylic acid diester compounds of polyalkylene glycol, to the (a) polyester resin in the polyester resin composition of the present invention is not particularly limited, and a generally known method can be used. For example, a powder or pellets of the (a) polyester resin and (b) and (c) may be mixed by dry blending, or parts of (b) and (c) may be pre-blended and then dry-blended with the remaining components. After dry blending, the resultant blend may be mixed using a mill roll, a Banbury mixer, a super mixer, or the like and kneaded using a single- or twin-screw extruder or the like. The kneading is generally performed at a temperature of about 200° C. to 350° C. Alternatively, a method of adding (b) and (c) in the polymerization step of the polyester or a method of preparing a master batch containing high concentrations of (b) and (c) and then adding the master batch to the polyester resin can be used.

Like general plastics, the polyester resin composition of the present invention is mainly used as a molding material for various molded products.

In molding the polyester resin composition of the present invention, molding such as extrusion molding, injection molding, blow molding, vacuum molding, compression molding, or the like can be performed in the same manner as general plastics, and various molded products such as sheets, rods, bottles, vessels, and the like can be easily formed.

The polyester resin composition of the present invention may be mixed with glass fibers, carbon fibers, or the like to prepare fiber-reinforced plastic.

EXAMPLES

Although the present invention is described in further detail below with reference to production examples and examples, the present invention is not limited by these production examples and examples. The term "production example" represents a method for producing the polyester resin composition of the present invention, and the term "example" represents evaluation of the resultant polyester resin compositions.

Production Example 1

A resin composition produced by adding 1 part by mass of each of the sulfonamide compound metal salts (thereafter called "Test Compound A") and 4 parts by mass of each of the aliphatic carboxylic acid diester compounds of polyalkylene glycol (thereafter called "Test Compound B") shown in Table 2 below, to 100 parts by mass of polyethylene terephthalate resin (TR-8550; manufactured by Teijin Chemicals, Ltd.) was mixed. Then, each of the resultant resin compositions were dried under reduced pressure at 140° C. for 3 hours and kneaded with a single-screw extruder (Labo Plastomill μ; Toyo Seiki Seisaku-sho, Ltd.) at a cylinder temperature of 270° C. and a screw speed of 150 rpm to prepare pellets. Each of the resultant pellets were dried at 140° C. for 3 hours and then evaluated as described below. In the "Test Compound A" and "Test Compound B" in the Table, each "Compound No." corresponds to the above-described Compound Nos. 1 to 29

(1) Crystallization Temperature

The resulting pellets, obtained by the above-described method, were heated to 270° C. at a rate of 50° C./min, maintained for 10 minutes, and then cooled to 100° C. at a rate of 10° C./min in a differential scanning calorimeter (Diamond; Perkin Elmer Inc.) to determine the crystallization temperature. The results are shown in Table 2 below.

(2) Semi-Crystallization Time

The resulting pellets were heated to 270° C. at a rate of 50° C./min, maintained for 10 minutes, and then cooled to a predetermined temperature (220° C. to 230° C.) at a rate of 200° C./min in a differential scanning calorimeter (Diamond; Perkin Elmer Inc.). After the predetermined temperature was attained, the temperature was kept for 30 minutes to determine a time required until the quantity of endothermic enthalpy heat reached half the whole heat required for crystallization. The time was considered as the semi-crystallization time. The results are shown in Table 3 below.

TABLE 2

| | Test Compound A | Test Compound B | Crystallization temperature [° C.] |
|---|---|---|---|
| Example 1-1 | Compound No. 9 | Compound No. 22 | 226.1 |
| Example 1-2 | Compound No. 9 | Compound No. 23 | 226.7 |
| Comparative Example 1-1 | Control[1] | — | 202.4 |
| Comparative Example 1-2 | Compound No. 9 | — | 225.3 |
| Comparative Example 1-3 | Compound No. 9 | Comparative Compound 1[2] | 223.1 |
| Comparative Example 1-4 | Compound No. 9 | Comparative Compound 2[3] | 222.3 |

[1]Control: No crystal nucleator was added
[2]ADK CIZER-PN-7000M (ADEKA CORPORATION)
[3]N-butyltoluenesulfonic acid amide

TABLE 3

| | Test Compound A | Test Compound B | Semi-crystallization time [sec] | | | |
|---|---|---|---|---|---|---|
| | | | 215° C. | 220° C. | 225° C. | 230° C. |
| Example 2-1 | Compound No. 9 | Compound No. 23 | — | — | — | 43 |
| Comparative Example 2-1 | Control[1] | — | 98 | 164 | 280 | >600 |
| Comparative Example 2-2 | Compound No. 9 | — | — | — | 30 | 58 |

[1]Control: No crystal nucleator was added

From the results shown in Table 2, in the case of the polyester resin composition, which was added the (c) aliphatic carboxylic acid diester compounds of polyalkylene glycol according to the present invention in combination, it was confirmed that the crystallization temperature raised more than that by addition of the (b) sulfonamide compound metal salt singly. From the results shown in Table 3, in the case of the polyester resin composition, which was added the (c) aliphatic carboxylic acid diester compounds of polyalkylene glycol of the present invention in combination, it was also confirmed that the crystallization rate improved more than that by addition of the (b) sulfonamide compound metal salt singly.

Therefore, it was confirmed that, according to the present invention, by adding the (b) sulfonamide compound metal salt in combination with the (c) aliphatic carboxylic acid diester compounds of polyalkylene glycol to the (a) polyester resin, a polyester resin composition which had high crystallization temperature and was excellent in crystallization acceleration.

The invention claimed is:

1. A polyester resin composition comprising (a) an aromatic polyester resin,
   (b) one or more sulfonamide compound metal salt having a structure represented by the following general formula (1):

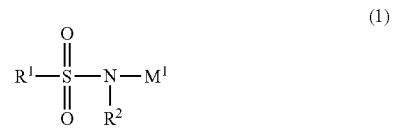

(in the formula (1), $R^1$ and $R^2$ each independently represent a hydrogen atom, a halogen atom, an alkali metal atom, an amino group, a branched or linear alkyl group which may have substituents and has 1 to 10 carbon atoms, a branched or linear alkoxy group which may have substituents and has 1 to 10 carbon atoms, or a cyclic group which may have substituents and has 3 to 30 carbon atoms; $R^1$ and $R^2$ may be bonded together to form a cyclic group; $M^1$ represents a halogen atom, an alkali metal atom or $Al(OH_2)_2$),
   (c) an aliphatic carboxylic acid diester compound of polyalkylene glycol represented by the following general formula (4):

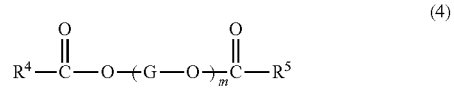

(in the formula (4), G represents an alkylene group having 2 to 4 carbon atoms; $R^4$ and $R^5$ each independently represent an alkyl or alkenyl group having 1 to 14 carbon atoms; m represents a integral number of 2 to 30), wherein the aliphatic carboxylic acid diester compound of polyalkylene glycol is mixed in an amount of 0.5 to 15 parts by mass relative to 100 parts by mass of the aromatic polyester.

2. The polyester resin composition according to claim 1, wherein G in the above-described formula (4) is ethylene, and $R^4$ and $R^5$ are 2-ethylhexyl.

3. The polyester resin composition according to claim 2, wherein the compound represented by the above-described formula (4) is an aliphatic carboxylic acid diester compound of polyalkylene glycol obtained from polyethylene glycol having an average molecular weight of 300 and 2-ethylhexanoic acid.

4. The polyester resin composition according to claim 2, wherein the compound represented by the above-described formula (4) is an aliphatic carboxylic acid diester compound of polyalkylene glycol obtained from polyethylene glycol having an average molecular weight of 600 and 2-ethylhexanoic acid.

5. The polyester resin composition according to claim 1, wherein the $M^1$ in the above-described formula (1) is an alkali metal atom.

6. The polyester resin composition according to claim 5, wherein the above-described alkali metal atom is a sodium atom.

7. A polyester resin composition comprising (a) a polyester resin,
(b) one or more sulfonamide compound metal salt having a structure represented by a general formula selected from the group consisting of the following general formula (1):

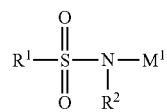
(1)

(in the formula (1), $R^1$ and $R^2$ each independently represent a hydrogen atom, a halogen atom, an alkali metal atom, an amino group, a branched or linear alkyl group which may have substituents and has 1 to 10 carbon atoms, a branched or linear alkoxy group which may have substituents and has 1 to 10 carbon atoms, or a cyclic group which may have substituents and has 3 to 30 carbon atoms; $R^1$ and $R^2$ may be bonded together to form a cyclic group; $M^1$ represents a halogen atom, an alkali metal atom or $Al(OH_2)_2$), the following general formula (2):

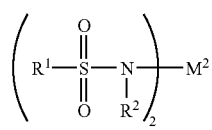
(2)

(in the formula (2), $R^1$ and $R^2$ represent the same meanings as in the formula (1); $M^2$ represents magnesium, calcium, strontium, barium, titanium, manganese, iron, zinc, silicon, zirconium, yttrium, barium, Al(OH), a branched or linear alkylene group which may have substituents and has 1 to 12 carbon atoms, a branched or linear alkenylene group which may have substituents and has 2 to 12 carbon atoms, a cycloalkylene group which may have substituents and has 3 to 8 carbon atoms, a branched or linear alkylene group which may have substituents and has ether bonds and 4 to 20 carbon atoms, a branched or linear alkylene group which may have substituents and is interrupted by a cycloalkylene group and 5 to 20 carbon atoms, an arylene group which may have substituents and has 6 to 12 carbon atoms, or a combination thereof), and the following general formula (3):

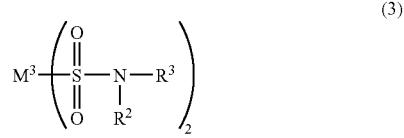
(3)

(in the formula (3), $R^2$ and $R^3$ each independently represent a hydrogen atom, a halogen atom, an alkali metal atom, an amino group, a branched or linear alkyl group which may have substituents and has 1 to 10 carbon atoms, a branched or linear alkoxy group which may have substituents and has 1 to 10 carbon atoms, or a cyclic group which may have substituents and has 3 to 30 carbon atoms; $R^2$ and $R^3$ may be bonded together to form a cyclic group; $M^3$ represents the same meanings as $M^2$ in the above general formula (2)), and
(c) an aliphatic carboxylic acid diester compound of polyalkylene glycol represented by the following general formula (4):

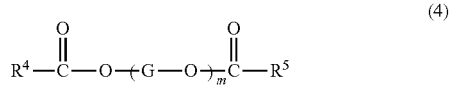
(4)

(in the formula (4), G represents an alkylene group having 2 to 4 carbon atoms; $R^4$ and $R^5$ each independently represent an alkyl or alkenyl group having 1 to 14 carbon atoms; m represents a integral number of 2 to 30);
wherein the $R^1$ and $R^2$ in the above-described formula (1) are phenyl groups.

8. The polyester resin composition according to claim 1, wherein the (b) sulfonamide compound metal salt is mixed in an amount of 0.01 to 10 parts by mass and the (c) aliphatic carboxylic acid diester compound of polyalkylene glycol is mixed in an amount of 0.5 to 10 parts by mass, relative to 100 parts by mass of the (a) polyester resin.

9. The polyester resin composition according to claim 1, wherein the (a) polyester resin is polyethylene terephthalate, polybutylene terephthalate, or polyethylene naphthalate.

* * * * *